United States Patent [19]

Smith, Jr. et al.

[11] 4,122,340
[45] Oct. 24, 1978

[54] PULSED NEUTRON POROSITY LOGGING SYSTEM

[75] Inventors: Harry D. Smith, Jr., Houston; Michael P. Smith, Bellaire; Ward E. Schultz, Houston, all of Tex.

[73] Assignee: Texaco Inc., New York, N.Y.

[21] Appl. No.: 789,059

[22] Filed: Apr. 20, 1977

[51] Int. Cl.² .............................................. G01V 5/00
[52] U.S. Cl. .................................. 250/264; 250/265; 250/269
[58] Field of Search ............... 250/266, 264, 265, 269, 250/270

[56] References Cited

U.S. PATENT DOCUMENTS

| | | | |
|---|---|---|---|
| 3,491,238 | 1/1970 | Allen | 250/269 |
| 3,509,346 | 4/1970 | Mills et al. | 250/262 |
| 3,869,608 | 3/1975 | Scherbatskoy | 250/269 |
| 3,947,683 | 3/1976 | Schultz et al. | 250/270 |

Primary Examiner—Alfred E. Smith
Assistant Examiner—Janice A. Howell
Attorney, Agent, or Firm—Carl G. Ries; Thomas H. Whaley; William J. Beard

[57] ABSTRACT

An improved pulsed neutron porosity logging system is provided in the present invention. A logging tool provided with a 14 MEV pulsed neutron source, an epithermal neutron detector, and a fast neutron detector is moved through a borehole. Repetitive bursts of neutrons irradiate the earth formations and, during the bursts, the fast neutron population is sampled. During the interval between bursts the epithermal neutron population is sampled along with background gamma radiation due to lingering thermal neutrons. The fast and epithermal neutron population measurements are combined to provide a measurement of formation porosity.

8 Claims, 5 Drawing Figures

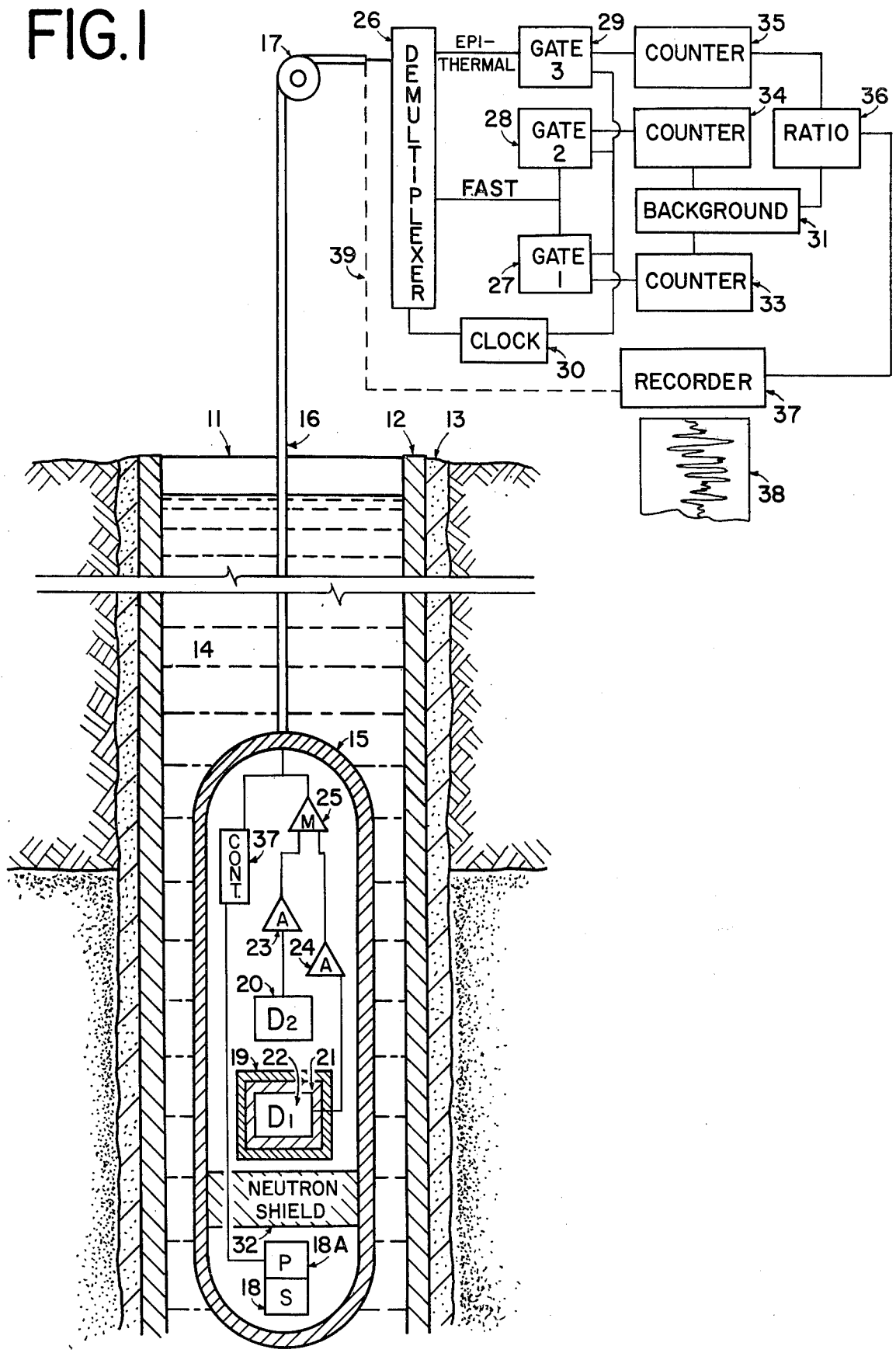

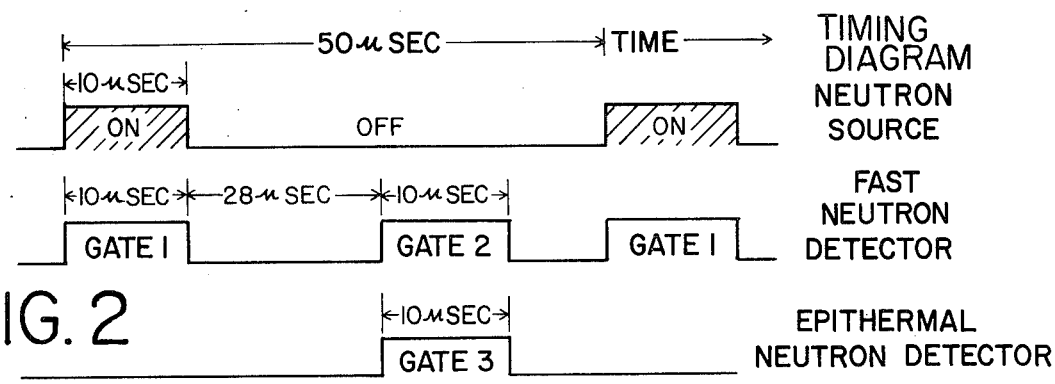
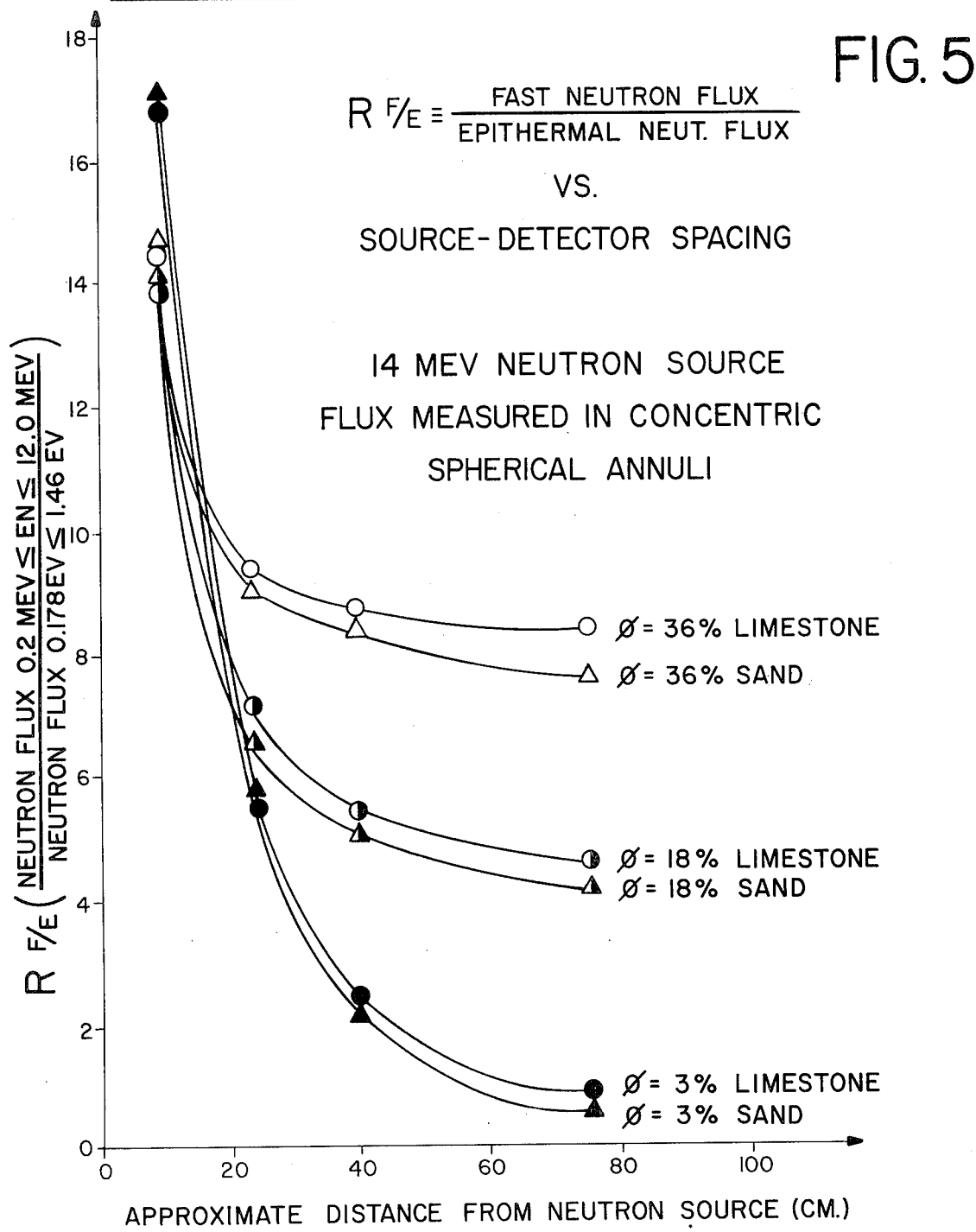

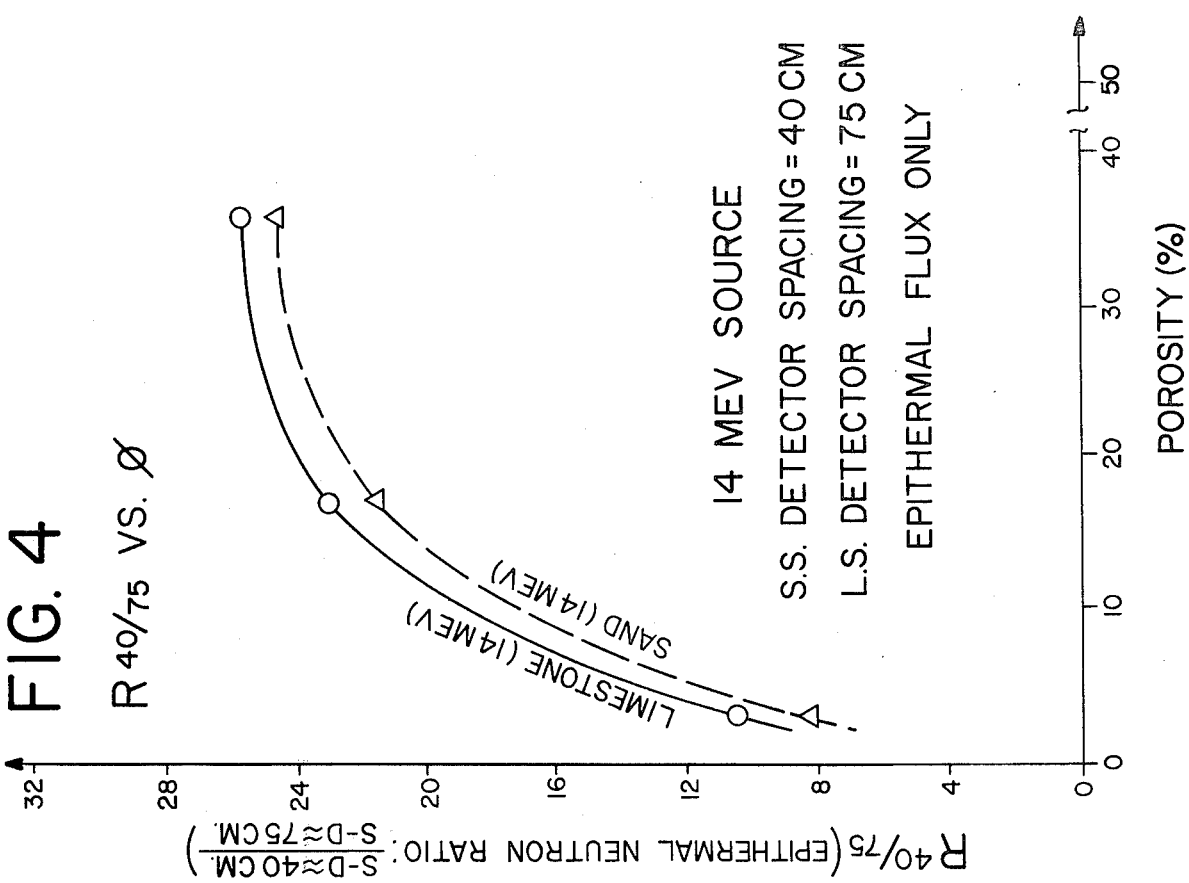
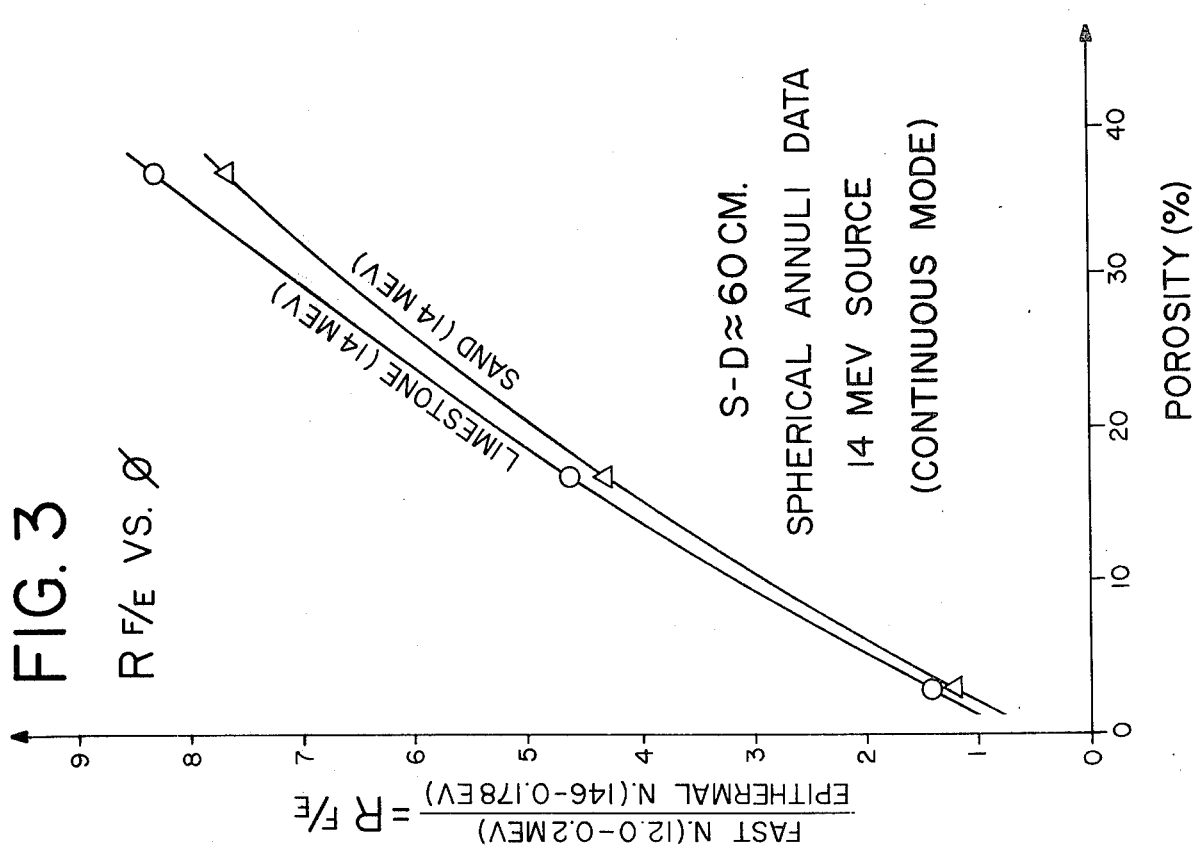

PULSED NEUTRON POROSITY LOGGING SYSTEM

BACKGROUND OF THE INVENTION

This invention relates to radiological well logging methods and apparatus for investigating the characteristics of subsurface earth formations traversed by a borehole, and more particularly, to methods and apparatus for measuring the porosity of earth formations in the vicinity of a well borehole by means of pulsed neutron well logging techniques.

In the search for hydrocarbons beneath the earth's crust one of the parameters which must be known about an earth formation before evaluating its commercial potential is the fractional volume of fluid filled pore space, or porosity, present around the rock grains comprising the earth formation. Several techniques have been developed in the prior art to measure earth formation porosity in a borehole environment. One such technique employs a gamma ray source and a single, or multiple, detectors to measure the electron density of the earth formations by gamma ray scattering. This leads to an inferential measurement of the porosity of the formations. Another technique employs an acoustic transmitter and one or more acoustic receivers. The velocity of sound transmission through the formation from the acoustic transmitter to the receivers is then measured and this quantity can be related to the porosity since sound travels faster in less porous rocks than in fluid filled pore spaces in the earth formations.

A third commercial technique which has been employed in the prior art to measure the porosity of earth formations employs a neutron source and either a neutron or gamma ray detector sensitive to low energy, or thermalized, neutron density. Hydrogen is the principal agent responsible for slowing down neutrons emitted into an earth formation. Therefore, in a formation containing a larger amount of hydrogen than is present in low porosity formations the neutron distribution is more rapidly slowed down and is contained in the area of the formation near the source. Hence, the counting rates in remote thermal neutron sensitive detectors located several inches or more from the source will be suppressed. In lower porosity formations which contain little hydrogen, the source neutrons are able to penetrate farther. Hence, the counting rates in the detector or detectors are increased. This behavior may be directly quantified into a measurement of the porosity via well established procedures.

All of these commercially employed methods have generally not proven to be as accurate as desirable due to diameter irregularities of the borehole wall, variation of the properties of different borehole fluids, the irregular cement annulus surrounding the casing in a cased well borehole, and the properties of different types of steel casings and formation lithologies which surround the borehole. For example, the thermal neutron distribution surrounding a source and detector pair sonde as proposed in the prior art can be affected by the chlorine content of the borehole fluid. Similarly, lithological properties of the earth formations in the vicinity of the borehole, such as the boron content of these formations, can affect the measurement of thermal neutron populations. The present invention however, rather than relying on a measurement of the thermal neutron population comprises a neutron measurement of the formation porosity which utilizes a measure of the epithermal neutron population at one detector and the background corrected fast neutron population at a second detector spaced approximately the same distance from a pulsed neutron source. Special detectors and other means are utilized in the present invention to effectively discriminate against the detection of thermal neutrons or their resultant capture gamma rays as proposed by prior art thermal neutron population measurement techniques.

Thus, it is an object of the present invention to provide an improved method and apparatus for measuring the porosity of earth formations in situ in a well borehole using pulsed neutron source techniques.

Another object of the present invention is to provide an improved technique for measuring the porosity of earth formations in the vicinity of a well borehole by combining measurements of the epithermal neutron population and the fast neutron population using pulsed neutron source techniques.

BRIEF DESCRIPTION OF THE INVENTION

In accordance with the present invention, a pulse operated high energy neutron source irradiates the earth formations surrounding a well borehole with repetitive bursts of fast neutrons. A pair of neutron detectors, one sensitive to neutrons in the epithermal energy range, and another sensitive to fast neutrons, which are effectively spaced approximately the same distance from the neutron source, measure the fast and epithermal neutron populations at this effective distance. The fast neutron measurements are background corrected and separated from thermal neutron interactions by time gating techniques and by pulse shape discrimination. The measurements of the fast and epithermal neutron populations at the two detectors may then be interpreted in terms of the earth formation porosity in accordance with predetermined relationships. The techniques and apparatus of the present invention give improved results over prior art devices in that less sensitivity to disturbing environmental parameters results from the use of the present invention.

For a better understanding of the present invention, together with other and further objects and features thereof, together with additional advantages, reference is made to the following detailed description of the invention which is to be taken conjunction with the appended drawings in which:

BRIEF DESCRIPTION OF THE DRAWINGS

FIG. 1 is a schematic diagram showing a pulsed neutron well logging system according to the principles of the present invention, and having two neutron detectors located at approximately the same distance from a pulsed neutron source;

FIG. 2 is a timing diagram of the system of FIG. 1.

FIG. 3 is a graphical relationship illustrating the variation of the neutron flux ratio of a fast neutron detector to an epithermal neutron detector spaced approximately the same distance from a 14 MEV neutron source for sandstone and limestone formations of differing porosities;

FIG. 4 is a graphical relationship illustrating the ratio of epithermal neutron populations at two different distances from a 14 MEV neutron source for different porosity sandstone and limestone formations; and FIG. 5 is a graphical relationship illustrating the fast neutron to epithermal neutron population ratio for several different porosity sandstone and limestone formations as a function of detector distance from a 14 MEV neutron source.

DESCRIPTION OF THE PREFERRED EMBODIMENTS

Referring initially to FIG. 1 there may be seen a simplified schematic functional representation in the form of a block diagram of a well logging apparatus in accordance with the present invention. A well borehole 11 penetrating earth formations is lined with a steel casing 12 and is filled with a well fluid 14. The steel casing 12 may be cemented in place by cement layer 13 which also serves to prevent fluid communication between adjacent producing formation in the earth.

The downhole portion of the logging system may be seen to be basically composed of an elongated, fluid tight, hollow, body member or sonde 15 which, during the logging operation, is passed longitudinally through the casing 12 and is sized for passage therethrough. Surface instrumentation, whose function will be discussed in more detail subsequently, is shown for processing and recording electrical measurements provided by the sonde 15. A well logging cable 16 which passes over a sheave wheel 17 supports the sonde 15 in the borehole 11 and also provides a communication path for electrical signals to and from the surface equipment and the sonde 15. The well logging cable 16 may be of conventional armored cable design and may have one or more electrical conductors for transmitting such signals between the sonde 15 and the surface apparatus.

Again, referring to FIG. 1 the sonde 15 contains, at its lower end, a pulsed neutron source 18. This neutron source may comprise a deuterium-tritium accelerator tube which can be operated in pulsed mode to provide repetitive pulses or bursts of essentially monoenergetic 14 MEV neutrons and capable of providing on the order of $10^{+8}$ neutrons per second. A pulsing circuit 18A provides electrical pulses which are timed in a manner to be described subsequently to cause the neutron generator 18 to repetitively emit neutron pulses of approximately 10 microseconds duration.

Radiation detectors 20 and 22 are provided in the downhole sonde 15 and are separated from the neutron source 18 by a neutron shielding material 32. The neutron shield material 32 may comprise any highly hydrogenous material which serves to effectively slow down and shield the detectors 20 and 22 from direct neutron irradiation by the neutron source 18. Any suitably highly hydrogenous material such as paraffin or hydrocarbon polymer plastics suitable for this purpose. While the two detectors 20 and 22 are shown slightly separated from each other in the drawing of FIG. 1, it will be appreciated that in the preferred mode of the present invention, the two detectors 20 and 22 should be located at approximately the same distance from the neutron source as is practicable. An alternative arrangement in which both detectors may be situated at precisely the same distance from the source would be to place one detector above and one detector below the neutron source 18 at the desired distance.

The detector 20 of FIG. 1 is a fast neutron detector. This detector may comprise a scintillation type detector which is sensitive to the interaction of the scintillator material with fast neutrons. Such a detector could comprise, for example, a stilbene detector which is sensitive to fast neutron interactions. Such scintillation detectors may also be sensitive to high energy gamma radiation produced by the capture of neutrons from the neutron source in earth formations surrounding the well borehole. However, the pulse shape characteristics of gamma ray interactions produced by such captures may be distinguished from the pulse shape characteristics in such a detector provided by the interaction of a fast neutron with the detector material. Such a stilbene fast neutron detector is described in the publication entitled "A SCINTILLATION COUNTER WITH NEUTRON GAMMA RAY DISCRIMINATORS" by F. D. Brooks, Published by the Atomic Energy Research Establishment, Harwell, England, 1959, and having laboratory publishing number HL. 59/282 (s.c.9).

The second detector 22 contemplated for use in the present invention is an epithermal neutron detector. This detector which may comprise, for example, a pressurized $He^3$ detector is sensitive to neutrons in the epithermal energy range from approximately 0.178 electron volts to approximately 1.46 electron volts. This is contrasted to the fast neutron detector 20 which is essentially sensitive to fast neutrons having energies in the range of from roughly $0.2 \times 10^{+6}$ electrons volts to $12 \times 10^{+6}$ electron volts. Thus, the two neutron detectors 22 and 20 provide two energy bands or windows in which the neutron population energy spectrum may be observed by the downhole well logging sonde 15. The epithermal neutron detector 22 is embedded in a layer of hydrogenous material 21 and is surrounded by a relatively thin, for example 0.20 inch, layer of thermal neutron absorbing material 19 such as cadmium or the like. The $He^3$ detector 22 is thus shielded from the interaction of thermalized neutrons due to the action of the cadmium layer 19 which, having an extremely large neutron capture cross-section, effectively absorbs all, or most, thermal neutrons in the vicinity of detector 22 before these neutrons can impinge upon the detector and cause any interaction with the detector 22.

In any event, the detectors 20 and 22 provide electrical pulse signals which are representative of the number of neutrons present at their location in the epithermal energy range and in the fast neutron energy range to which the detectors are sensitive. The electrical signals from the detector 20 are amplified in an amplifier 23 and supplied to a multiplexing mixing circuit 25 Similarly, the electrical pulse representations from the epithermal detector 22 are conducted to an amplifier 24 and also supplied to the mixer 25. The mixed signals are supplied via cable 16 conductors to a surface demultiplexer circuit 26. This circuit for example may discriminate against signals from the two downhole detectors on the basis of their polarity. Output signals from the demultiplexer 26 comprise pulse signals representative of the fast neutron population in the vicinity of the detector 20 and the epithermal neutron population signals present in the vicinity of detector 22. The fast neutron pulse signals are supplied to two time gate circuits 27 and 28. The epithermal neutron population signals are supplied to a third time gate 29.

Time gates 27, 28 and 29 are supplied with clocking signals from a clock circuit 30. A control circuit 37 in the downhole tool supplies control signals to the neutron generator pulser circuit 18A each time the neutron generator tube 18 is to emit a pulse of 14 MEV neutrons of 10 microsecond duration. This pulse occurs once every 50 microseconds in the embodiment of the invention illustrated in FIG. 1. Simultaneously this neutron generator firing pulse is provided by the control circuit 37 to a conductor of the logging cable 16 for transmission to the surface of the earth. The surface demultiplexer 26 separates these firing pulses out and provides an output pulse corresponding to each one to the clock circuit 30.

Clock circuit 30 provides a conditioning pulse immediately upon receipt of the generator fire pulse to time gate 27, this pulse being of 10 microseconds duration. After a delay of 38 microseconds the clock circuit 30 then provides conditioning pulses to time gates 28 and 29, these pulses also being of 10 microseconds duration. This timing sequence is illustrated schematically in the timing diagram of FIG. 2.

The effect of this timing sequence is for time gate 27 (labeled Gate 1) to allow passage of fast neutron population count pulses from downhole fast neutron detector 20 to pass to a counter circuit 33 only during the burst of neutrons of 10 microseconds duration emitted by the neutron generator 28 in the downhole sonde 15.

Similarly the counts occurring in the epithermal neutron detector 22 in the downhole sonde 15 are only permitted to enter a counter 35 via the time gate 29 (labelled gate 3) for a 10 microsecond duration interval beginning 38 microseconds after the initiation of a downhole neutron burst. Likewise only during this same 10 microsecond interval are counts from the fast neutron detector 20 permitted to enter a background counter circuit 34 at the surface via time gates 28 (labelled gate 2).

The counters 27, 28 and 29 thus provide counts of the number of fast neutrons present in the vicinity of detector 20, background counts due to capture gamma rays resulting from lingering thermal neutrons in the vicinity of detector 20 and epithermal neutrons present in the vicinity of detector 22 in the form of digital counts. A background corrected count of the fast neutron population is formed in background correction circuit 31 by subtracting the background count in counter 34 from the fast neutron population count in counter 33. Since the background time gate 28 occurs just prior (2 microseconds) to the next neutron pulse this provides a good approximation to the background gamma rays due to lingering thermal neutrons present in the vicinity of detector 20 from the previous pulse. Thus any response of detector 20 to thermal neutrons is minimized. Counts from background correction circuit 31 and epithermal counter 35 may be strobed or sychronized at a predetermined rate, for example one per second, into a digital ratio circuit 36. The ratio circuit 36 forms the ratio of counting rates at the two detectors, for example the ratio of fast neutron population present at detector 20 to the epithermal neutron population present at detector 22. It will be appreciated by those skilled in the art that it is possible to weight the ratio to compensate for effects produced by any difference in the distance of the two detectors from the neutron source so that a ratio measurement which is normalized to detectors located at the same distance from the neutron source may be obtained. Similarly, the ratio can be weighted to normalize any differences in detector sensitivities.

It has been discovered by the applicants that this ratio signal is functionally related as will be described subsequently to the earth formation porosity of the earth formations in the vicinity of the downhole sonde. The output signal from the ratio circuit 36 is supplied to a data recorder 37 which may be of the typical strip chart or film recorder type used in well logging. The recorder 37 provides an output trace of the ratio signal on a record medium 38 as a function of borehole depth. The depth information is obtained by mechanically or electrically coupling the recorder 37 to the sheave wheel 17 as indicated by the dotted line 39 of FIG. 1 in a conventional manner as known in the art.

While not shown in FIGS. 1 and 2, it will be appreciated by those skilled in the art that conventional electrical power supplies can be situated, for example, at the surface, to supply operating voltages for the circuit components in the downhole sonde 15 in a manner known in the art.

If desired, the total count rate in each of the detectors integrated over any desired energy range may also be used as a porosity indicator. FIG. 4 illustrates, for example, the ratio of counts in two epithermal energy range detectors at spacings of 40 cm. and 75 cm. While this ratio does not exhibit the linearity of the fast to epithermal ratio measurement of FIG. 3 it does represent an improvement in lithology effect over prior art thermal neutron porosity measurements made using a 14 MEV pulsed neutron source. If desired, an energy threshold can be set to exclude any thermal or epithermal neutron count rates which may be present in the fast neutron detector. As previously mentioned these counts may also be discriminated against on the basis of their different pulse shape characteristics in the stilbene detector.

Turning now to FIGS. 3, 4 and 5, the basis for the porosity measurement of a well logging system according to the present invention is illustrated. FIG. 3 illustrates graphically the ratio of fast neutron population in the energy range from 0.2 MEV to 12 MEV to epithermal neutron population in the energy range from 0.178 EV to 1.46 EV at source to detector spacings of 60 cm. from a 14 MEV deuterium-tritium neutron accelerator. Values of the ratio are shown for both sandstone and limestone lithologies. It can be observed that no large lithology effect is present in this measurement of porosity and that the ratio varies nearly linearly over the entire porosity range of from 3 to 36%. This represents a dramatic improvement over prior art porosity measurements made with 14 MEV neutron sources and detectors spaced at shorter distances than the 60 cm. of the system shown in FIG. 3. Such prior art measurements suffered from non-linear response and lack of sensitivity to porosity changes high porosity range from 18 to 36% and also from lithology effects due to the measurement of thermal neutron capture reactions.

FIG. 5 illustrates the fast neutron to epithermal neutron population ratio over the same energy ranges as FIG. 3, but plotted as a function of source to detector spacing from a 14 MEV deuterium-tritium accelerator source. The sandstone and limestone lithology response for porosities in the range of from 3 to 36% is shown in FIG. 5 also. It can be observed from FIG. 5 that greater sensitivity of a system according to the present invention can be achieved with source to detector spacings in the range greater than 40 cm. Such spacings are preferred for porosity logging systems according to the present invention.

The present invention, by measuring only range remains less sensitive to formation lithology effects than other logs which measure neutron population in the thermal energy range. Small concentrations of boron or other strong thermal neutron absorbers do not adversely effect the measurement of the present invention.

It is possible, by placing calibration charts such as that of FIG. 3, 4, and 5 in the memory of a small general purpose digital computer, to compute and record the porosity of earth formations directly as a function of depth, utilizing a well logging system in accordance with the concepts of the present invention and as illustrated in FIG. 1. The calibration chart such as FIG. 3 could be, for example, entered in the memory of a computer in a tabular form. The neutron population measurements can be taken from the borehole instrument and supplied as input to a small computer such as the Model PDP-11 supplied by the Digital Equipment Corporation of Maynard, Mass. It would also be apparent given the disclosure of the invention present herein, for a programmer of ordinary skill to program such a small general purpose digital computer using a common compiler language such as FORTRAN and utilizing conventional mathematical interpolation procedures to perform this porosity calculation from the calibration charts in the manner described.

The foregoing descriptions may make other alternative arrangements of the concepts of the present invention, apparent to those skilled in the art. It is therefore, the aim of the appended claims to cover all such changes and modifications as may be made within the true spirit and scope of the invention.

We claim:

1. A method for determining the porosity of earth formations in the vicinity of a cased well borehole comprising the steps of:

repetitively irradiating earth formations in the vicinity of a cased well borehole with relatively short duration bursts of fast neutrons from a pulsed neutron source;

detecting essentially only during said repetitive neutron bursts at a spaced distance from said neutron source, the fast neutron population in the borehole and generating signals representative thereof;

detecting essentially only during the intervals between said neutron bursts at a spaced distance from said neutron source, the epithermal neutron population in the borehole and generating signals representative thereof; and combining said fast and epithermal neutron population representative signals to derive a measurement signal functionally related to the porosity of earth formations in the vicinity of the borehole.

2. The method of claim 1 and further including the steps of:

detecting essentially during the time interval between said repetitive neutron bursts, the background radiation present at the location where said fast neutron population is detected due to lingering neutrons from a previous neutron burst, and generating a background signal representative thereof; and compensating said fast neutron population representative signal for the background radiation by combining said fast neutron population representative signal and said background representative signal.

3. The method of claim 1 wherein the detecting step is performed by locating said fast neutron detector a distance of from 40 to 80 centimeters from said neutron source.

4. The method of claim 1 wherein the detecting step is performed by using a stilbene scintillation detector for fast neutrons.

5. The method of claim 1 wherein the irradiating step is performed with a pulsed deuterium-tritium reaction accelerator tube which emits essentially monoenergetic 14 MEV neutrons.

6. The method of claim 5 wherein said irradiating step is performed by emitting approximately 10 microsecond duration bursts of fast neutrons at a burst repetition rate of approximately 20,000 bursts per second.

7. The method of claim 1 wherein said combining step is performed by forming a ratio of said fast and epithermal neutron population representative signals.

8. The method of claim 7 and further including the step of calibrating said ratio signal according to a predetermined functional relationship to derive a porosity signal quantitatively representative of the porosity of earth formations in the vicinity of the borehole.

* * * * *